Figure 1:
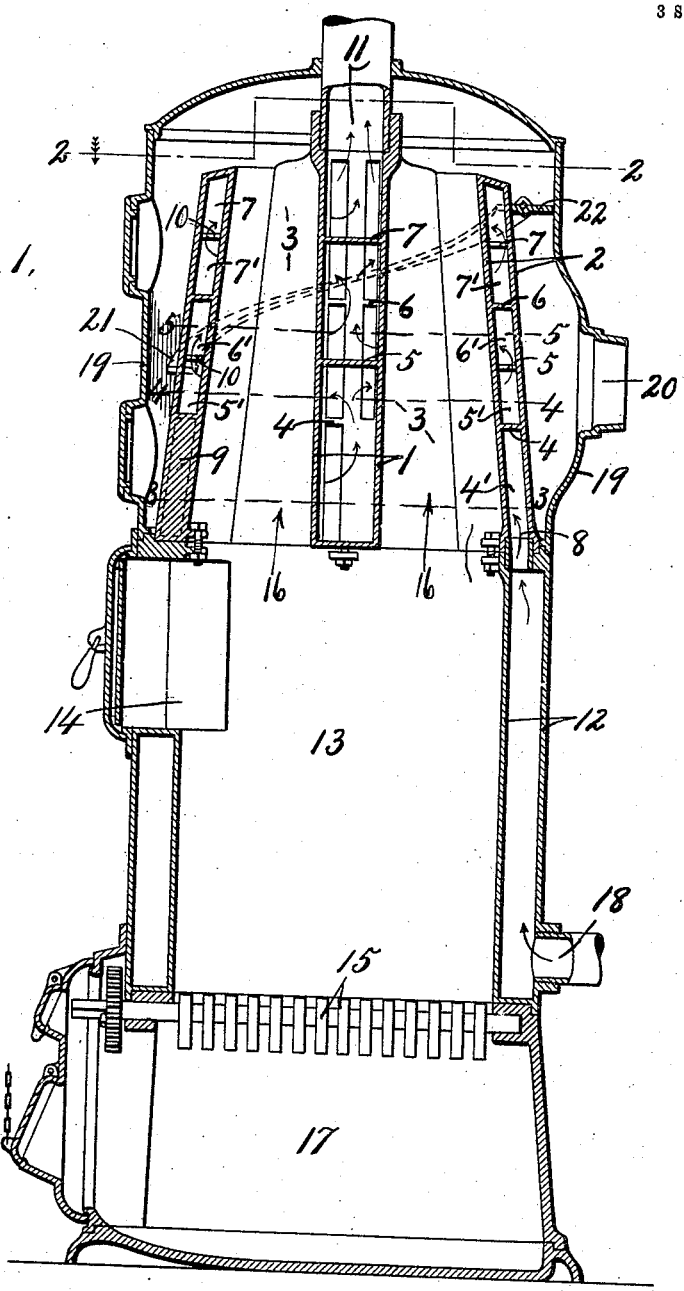

No. 843,793. PATENTED FEB. 12, 1907.
R. H. BRADLEY.
HOT WATER HEATER.
APPLICATION FILED DEC. 29, 1905.

3 SHEETS—SHEET 1.

WITNESSES:
B. E. Robinson
H. E. Chase

INVENTOR:
R. H. Bradley
BY:
Howard P. Denison
ATTORNEY.

THE NORRIS PETERS CO., WASHINGTON, D. C.

No. 843,793. PATENTED FEB. 12, 1907.
R. H. BRADLEY.
HOT WATER HEATER.
APPLICATION FILED DEC. 29, 1905.
3 SHEETS—SHEET 2.
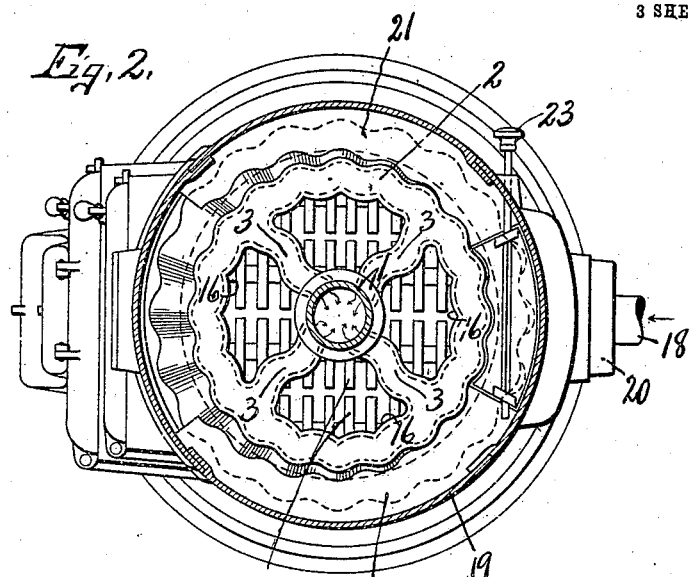
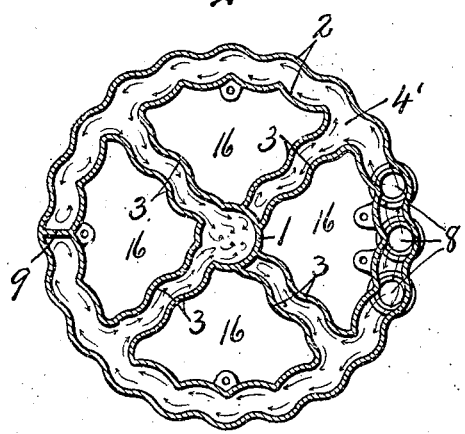
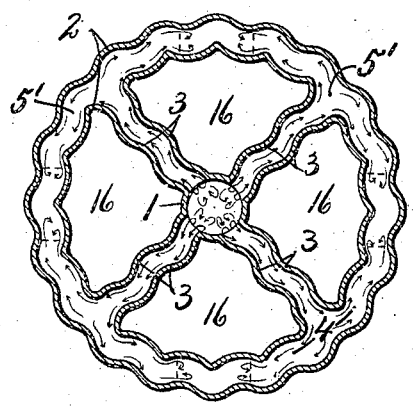
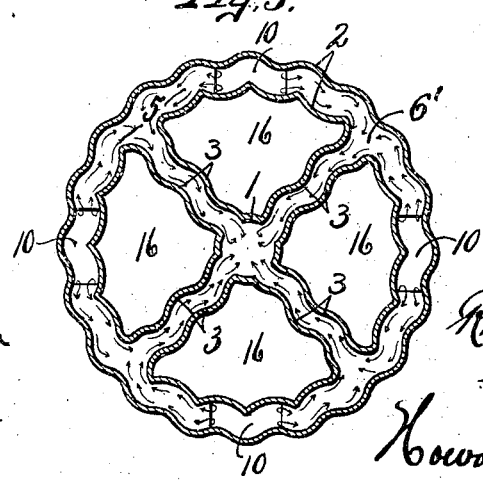
WITNESSES:
B. E. Robinson
H. E. Chase
INVENTOR:
R. H. Bradley
BY
Howard P. Denison
ATTORNEY.

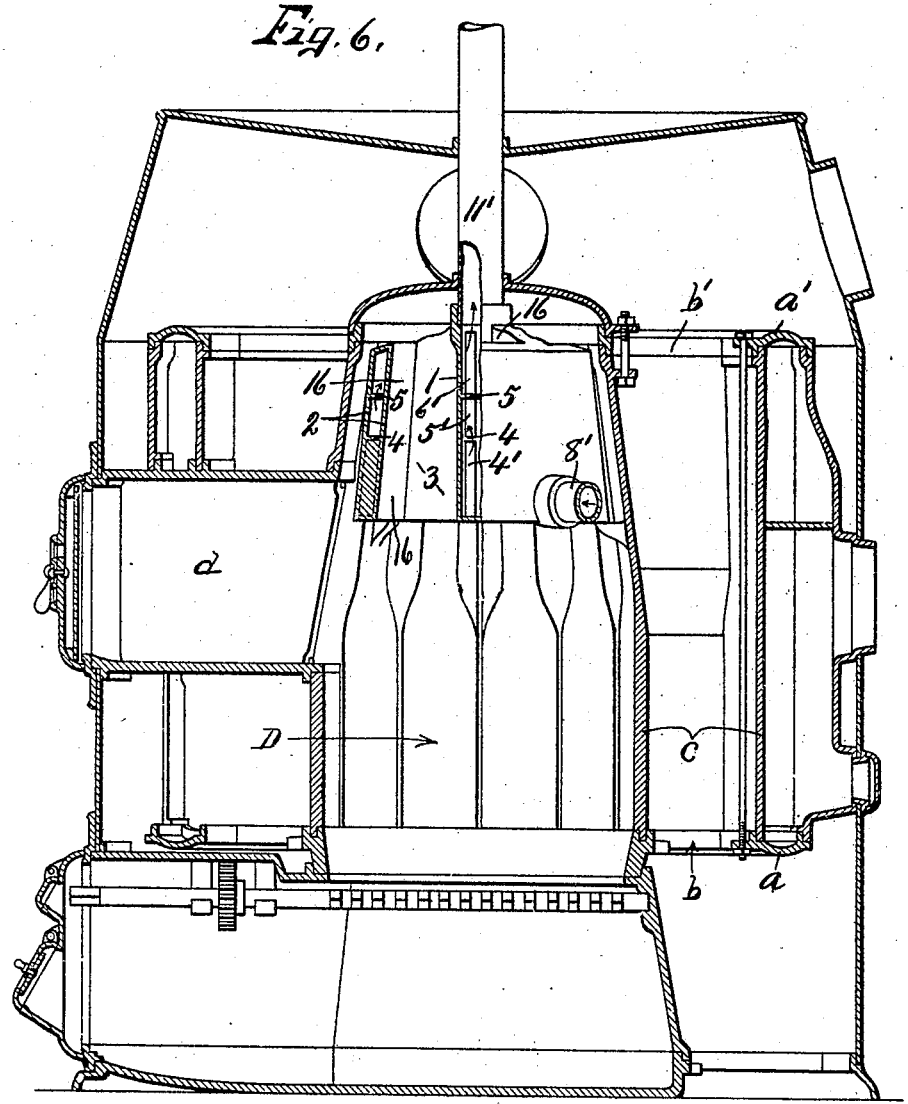

though they can not be fabricated
UNITED STATES PATENT OFFICE.

ROYAL H. BRADLEY, OF SYRACUSE, NEW YORK, ASSIGNOR TO KELSEY HEATING COMPANY, OF SYRACUSE, NEW YORK, A CORPORATION OF NEW YORK.

HOT-WATER HEATER.

No. 843,793.

Specification of Letters Patent.

Patented Feb. 12, 1907.

Application filed December 29, 1905. Serial No. 293,793.

*To all whom it may concern:*

Be it known that I, ROYAL H. BRADLEY, of Syracuse, in the county of Onondaga, in the State of New York, have invented new and useful Improvements in Hot-Water Heaters, of which the following, taken in connection with the accompanying drawings, is a full, clear, and exact description.

This invention relates to certain improvements in hot-water heaters, and refers more particularly to the construction of the upper section or dome, which is located above the combustion-chamber and is adapted to be used in connection with hot-air furnaces or with a suitable water-base surrounding the combustion-chamber.

The essential purpose of my invention is to provide an upwardly-tapering hollow casting or shell with comparatively shallow upright and radial waterways having horizontal partitions or baffle-plates so arranged as to cause the water to travel from the inlet at the base circumferentially and radially in tortuous paths to and from the center and to finally discharge and flow upwardly from a central opening in the top of the water-circulating drum. In other words, I have sought to produce a water-circulating drum comprising a central tube and a concentric shell of considerably greater diameter connected to the center tube by radial water-passages spaced apart to form vertical fire-passages between the central tube and concentric ring and to corrugate the sides of the larger concentric shell and radial passages, so as to afford as large heating area as possible exposed to the products of combustion.

Another object is to make the water-circulating drum of less exterior diameter than the interior diameter of the shell which incloses it, so as to envelop practically the entire water-circulating shell within the products of combustion as they leave the combustion-chamber before escaping through the smoke-flue.

A still further object is to provide a spiral baffle-plate between the water-circulating shell and its inclosing jacket, so that the rear portion of the baffle-plate is elevated some distance above the smoke-outlet, while the ends or sides of such baffle-plate dip downwardly and forwardly toward the front, thereby causing the products of combustion which escape through the fire-flues in the water-circulating shell to pass downwardly and forwardly around the front ends of the baffle-plate before they can escape through the smoke-outlet and causing the products of combustion to travel around the outside of the water-circulating shell from top to bottom.

Another object is to make the rear portion of the baffle-plate separate and movable to form a damper at the rear of the water-circulating shell above the smoke-outlet, so that by opening the damper a direct draft or escape of the products of combustion may be had.

It is obvious from the foregoing statements that the main object is to expedite the heating of the water passing through the circulating-shell, or rather to obtain a maximum absorption of the heat by the water within a minimum period of time.

Other objects and uses relating to the specific structure of the water-circulating shell will be brought out in the following description.

In the drawings, Figure 1 is a transverse vertical sectional view from front to rear through a hot-water heater embodying the various features of my invention. Figs. 2, 3, 4, and 5 are sectional views taken, respectively, on lines 2 2, 3 3, 4 4, and 5 5, Fig. 1. Fig. 6 is a transverse vertical sectional view from front to rear of a hot-air furnace and my improved water-circulating shell mounted therein.

The hot-water heater shown in Figs. 1 to 5, inclusive, consists, essentially, of a central water-tube 1 and a concentric but upwardly-tapering water-circulating ring 2 of somewhat greater interior diameter than the outer diameter of the tube 1, but connected thereto by radial water-legs 3. The radial water-legs 3 are hollow and are preferably integral with and connect the interior of the hollow water-ring 2 with the interior of the central tube 1, forming comparatively shallow waterways and intervening vertical fire-passages 16, extending from the bottom to the top of and between the central water-tube 1 and water-ring 2. The interiors of the ring 2 and water-legs 3 are divided at intervals throughout their heights by horizontal partitions 4, 5, 6, and 7, the partitions 5 and 7 being also extended across the interior of the tubular water-leg 1, thereby dividing said interiors into a series of compartments, one above the other. The lower compartment, as 4', of the water-ring 2 has an inlet-opening 8 in or near its bottom, which may for the present be termed the "return-flow" opening, said compartment being divided vertically at the side diametrically opposite the inlet 8 by a vertical partition 9, extending from the horizontal partition 4 to the bottom of the compartment 4', thereby breaking the continuity of the water-passage in said compartment around the ring.

In the water-dome seen in Figs. 1, 2, and 3 and particularly in Fig. 3 I have shown a plurality of inlet-openings 8 as located between two of the radial water-legs 3, which latter communicate at their outer sides with the water-ring 2; but their inner sides are closed by the central water-leg 1 between the partition 4, while the remaining radial water-legs communicate directly with the central water-tube 1 and water-ring 2 at opposite sides of the vertical partition 9. It therefore follows that the water flowing into the inlet 8 will have to pass in opposite directions around the ring to the opposite side thereof before it can enter the central water-leg 1 through the adjacent radial water-legs 3, but at the same time is free to flow into all of the water-legs from the ring until the compartment 4' is filled, whereupon the continued inflow of water rises in the base of the central tube 1 above the partition 4 and escapes to the next superimposed compartment, as 5', through the radial water-legs 3, which connect the central water-leg with the water-ring 2. The portions of the next upper compartment 5 within the water-ring 2 are cut away, forming openings 10, thereby establishing communication between the compartment 5' and the next one above it, as 6', to allow the accumulated water to flow upwardly within the ring 2 through the openings 10 and into the compartments 6', from which it passes through the radial water-legs 3 into the central water-tube 1 above the partition 5 within said central water-leg, in which the water rises above the partition 6 and flows laterally again through the radial water-legs 3 and into the next compartment, as 7', and so on to the top. The next upper partition 7 also has portions thereof within the water-ring 2 cut away, forming openings 10, similar to those in the partition 5, to allow the water to pass upwardly within the water-ring above the partition 7, from which it returns through the radial water-legs 3 to the central tube 1 above the partition 7 therein and then passes upwardly and outwardly through an upflow-pipe 11, leading from the upper end of the tubular water-leg 1.

It will now be seen that the partitions 4 and 6 are continuous in the water-ring and radial water-legs, but are cut away in the interior of the tube 1, while the partitions 5 and 7 are continuous in the central tube and radial water-legs, but have portions thereof cut away in the water-ring 2, so as to cause the inflowing water to pass radially in tortuous paths from the inlet 8 to the outlet 11, thereby filling the compartments 4', 5', 6', and 7' successively. As previously explained, these water-passages are comparatively shallow transversely, and the sides thereof are preferably corrugated, so as to increase the heating area exposed to the products of combustion, which pass upwardly through the flues 16 and also around the outside of the ring 2, thereby practically enveloping the entire water-dome, including the central tube 1, water-ring 2, and radial water-legs 3.

The zigzag radial passage of the water back and forth from the ring to the central tube, and vice versa, through the radial water-legs 3, together with the envelopment of the comparatively shallow central water-tube 1, ring 2, and radial water-legs 3 within the products of combustion, produces a rapid circulation of the water with a minimum consumption of fuel and enables me to drive the hot water a greater distance from the heater than would be possible with a larger body of water concentrated in one chamber.

The central water-tube 1, ring 2, and radial water-legs 3 constitute what may be termed a "water-dome," which, as shown in Figs. 1 and 2, is mounted upon and has its inlet 8 connected to a water-base 12, forming a combustion-chamber 13, the latter having a suitable fuel-opening 14 and a grate-bottom 15, directly above a suitable ash-pit 17. The water-base 12 may be of any desired construction, having a return-flow pipe 18 at or near its lower end. A jacket 19 is also mounted upon the upper end of the water-base 12 and surrounds the water-ring 2, a sufficient space being left between the water-ring and jacket 19 to permit the products of combustion to pass downwardly around the base of the water-ring. This jacket is provided with a smoke-outlet 20 in its rear side between the lower and upper ends of the water-ring 2 and preferably some distance below the top of the water-ring, so as to cause the products of combustion which pass upwardly through the combustion-chamber 13 through the fire-flues 16 to return downwardly some distance around the outside of the water-ring before escaping through the smoke-outlet 20.

The heater thus far described is adapted to be used exclusively as a hot-water heater, and in order that I may obtain the greatest efficiency from a minimum consumption of fuel I have provided a spiral baffle-plate 21, which is located between the water-ring 2 and jacket 19, the rear portion of the baffle-plate being elevated some distance above the smoke-outlet 20 and comprises a movable section or damper 22, as best seen in Figs. 1 and 2, said damper being controlled by a suitable handpiece 23. The remaining portions of the baffle-plate extend forwardly and downwardly in opposite directions from the damper 22 at opposite sides of the water-ring 2 and terminate some distance apart at the front side of the water-ring in a plane some distance below the damper 22, so that when the damper is closed, as seen in Fig. 1, the products of combustion passing upwardly through the flues 16 are caused to pass forwardly and downwardly around the greater portion of the water-ring 2, where they escape between the ends of the opposite sides of the baffle-plate and then return rearwardly to the smoke-outlet 20.

When a direct draft is desired, the damper 22 may be opened, whereupon the products of combustion will pass rearwardly from the upper ends of the flues 16 downwardly at the rear side of the water-ring 2 and outwardly through the smoke-conduit 20.

It will be observed that the upper end of the water-ring 2 is of somewhat less diameter than its lower end, and therefore overhangs the combustion-chamber to a certain extent, thus causing the products of combustion to impinge against its inner face to a greater degree than if the sides were vertical, thereby further increasing the heating efficiency of the expended fuel.

In Fig. 6 I have shown a hot-air furnace having lower and upper decks $a$ and $a'$, formed with vertically-alined openings $b$ and $b'$, which are connected by upright air-flues $c$, the latter being arranged in a circular row forming a combustion-chamber D. The upper portions of the hot-air flues $c$ incline inwardly over the combustion-chamber, and in the upper part of the combustion-chamber is placed a water-dome similar to that seen in Figs. 1 and 2 and comprising a central tube 1, a water-ring 2, and radial water-legs 3, connecting the central tube 1 to the ring 3, but spaced apart for forming intervening fire-flues 16. This water-dome is provided with a series of, in this instance three, compartments 4′, 5′, and 6′, which are separated by horizontal partitions 4 and 5, corresponding to the partitions 4 and 5 and compartments 4′, 5′, and 6′. (Seen in Fig. 1.)

When used in connection with a furnace, as shown in Fig. 6, the lower compartment is provided with a lateral return-flow conduit 8′ in one side of the base of the ring 2, and the upper end of the central water-tube 1 terminates in an upflow-pipe 11′. In this instance the water-dome is supported in the upper end of the combustion-chamber D mostly above the fuel-inlet, as $d$, and is of somewhat less diameter than the inner diameter of the upper end of the combustion-chamber, leaving sufficient surrounding space for the products of combustion not only within the water-ring 2, but also at the outside of it, so that the whole dome is practically enveloped in the products of combustion, the same as shown in Figs. 1 and 2.

In the operation of my invention the water-dome, which comprises the center tube 1, water-ring 2, and radial water-legs 3, is supported in the upper end of the combustion-chamber, the water-ring having an inlet in its base and the central water-tube an outlet in its top, while the intervening portions of the whole device is provided with horizontal partitions dividing the interior water-space into a series of compartments located one above the other, the alternating partitions having openings within the water-ring and the other partitions having openings in the central water-tube, whereby the water is caused to travel in tortuous paths radially from the ring to the center tube, and vice versa.

What I claim—

1. In a hot-water heater, the combination with a combustion-chamber, of a water-dome above the combustion-chamber and comprising a central water-tube, a water-ring surrounding the tube, radial water-legs extending from top to bottom of the ring and connecting the tube with the ring, said legs being spaced apart forming intervening fire-passages extending from the bottom to the top of the dome.

2. In a hot-water heater, the combination with a combustion-chamber, of a hollow dome comprising a central water-tube, a water-ring surrounding the tube and spaced apart therefrom and radial water-legs connecting the tube with the ring and a series of horizontal partitions dividing the interior of the tube, ring and radial legs into horizontal compartments, the lower compartment having an inlet opening into the ring and the upper compartment having an outlet opening from the upper end of the central tube.

3. In a hot-water heater, the combination with a combustion-chamber, of a water-dome comprising a central water-tube, a concentric water-ring surrounding said tube and spaced apart therefrom, and radial water-legs connecting the ring and tube and spaced apart forming intervening fire-passages between the tube and ring, the upper end of the ring being of less interior diameter than the lower end, the ring having an inlet in its base, and the central tube having an outlet in its top, said water-legs being divided into compartments one above the other, each compartment communicating with the water-ring.

4. In combination with a combustion-chamber, a water-dome comprising a central tube, a water-ring surrounding the tube and communicating therewith, but spaced apart therefrom forming upright fire-flues between the tube and ring and converging toward their upper ends, the ring having an inlet in its base and the tube having an outlet in its top, said ring and tube being provided with horizontal partitions dividing their interiors into compartments, one above the other.

5. In a hot-water heater, the combination with a combustion-chamber, of a water-dome comprising a central water-tube, a water-ring surrounding the tube and spaced apart therefrom, radial water-legs connecting the tube with the ring and spaced apart forming intervening fire-passages, a jacket surrounding the dome and provided with a smoke-outlet below the upper ends of the fire-passages, and a baffle-plate between the dome and jacket having a portion thereof movable and located above the smoke-outlet, the opposite sides of said baffle-plate extending forwardly and downwardly from opposite ends of the damper-section and terminating some distance apart at the front of the dome.

6. In a hot-water heater, a hollow dome comprising a water-ring forming corrugated sides in combination with a central water-tube and radial water-legs connecting the tube with the ring.

7. In a hot-water heater, a hollow dome comprising an upwardly-tapering water-ring having corrugated sides, a central upright water-tube and radial water-legs connecting the tube with the ring.

8. In a hot-water heater, a dome comprising a hollow water-ring of less diameter at the top than at the base, a central water-tube and radial water-legs connecting the tube with the ring and having corrugated sides, said radial water-legs being spaced apart forming intervening vertical fire-passages.

9. In a hot-water heater, a dome comprising a hollow water-ring having an inlet in its base, a central tube and radial water-legs connecting the tube with the ring, said tube having an outlet in its top and divided into a series of compartments, one above the other, each compartment communicating through the water-legs with the ring.

10. In a hot-water heater, a dome comprising a hollow water-ring tapering upwardly from its base and having an inlet near the bottom, a central water-tube and radial water-legs connecting the tube with the ring, said tube having an outlet in its top, the ring and tube being spaced apart forming intervening fire-passages between the radial water-legs.

11. In a hot-water heater, a dome comprising an upwardly-tapering hollow water-ring having corrugated sides and an inlet in its base, the central water-tube having an outlet in its top, and corrugated radial water-legs connecting the tube and ring, and spaced apart forming intervening fire-passages.

12. In a hot-water heater, a dome comprising a forwardly-tapering hollow water-ring having an opening in its base, a central water-tube having an outlet in its top, radial water-legs connecting the top and ring and spaced apart forming intervening fire-passages and horizontal projections in the water-chambers of the ring, water-legs and tube dividing the water-space into a series of compartments one above the other.

13. In a hot-water heater, a dome comprising an upwardly-tapering water-ring having corrugated sides and an inlet in its base, a central water-tube having an outlet in its top and corrugated radial water-legs connecting the tube with the ring and spaced apart forming intervening fire-passages between the tube and ring, and water-legs having a series of horizontal partitions dividing the water-space into compartments one above the other.

In witness whereof I have hereunto set my hand this 21st day of December, 1905.

ROYAL H. BRADLEY.

Witnesses:
H. E. CHASE,
B. E. ROBINSON.